United States Patent [19]
Abe

[11] Patent Number: 5,568,194
[45] Date of Patent: Oct. 22, 1996

[54] ADJUSTING A WHITE BALANCE IN A CAMERA USING A FLASH

[75] Inventor: Nobuaki Abe, Sapporo, Japan

[73] Assignee: Asahi Kogaku Kogyo Kabushiki Kaisha, Tokyo, Japan

[21] Appl. No.: 453,470

[22] Filed: May 30, 1995

[30] Foreign Application Priority Data

May 31, 1994 [JP] Japan .................................. 6-140866

[51] Int. Cl.⁶ .................................................. H04N 9/73
[52] U.S. Cl. ...................... 348/223; 348/224; 348/227; 396/167; 396/246
[58] Field of Search .................................. 348/223, 224, 348/227, 655; 354/430, 413, 415, 420; H04N 9/73

[56] References Cited

U.S. PATENT DOCUMENTS

| | | | |
|---|---|---|---|
| 4,847,680 | 7/1989 | Okino | 348/223 |
| 4,918,519 | 4/1990 | Suzuki et al. | 348/223 |
| 4,989,093 | 1/1991 | Kaneko | 348/224 |
| 5,065,232 | 11/1991 | Kondo | 348/224 |
| 5,132,825 | 7/1992 | Miyadera | 348/223 |
| 5,168,364 | 12/1992 | Kondo et al. | 348/224 |

*Primary Examiner*—Safet Metjahic
*Assistant Examiner*—Glenton B. Burgess
*Attorney, Agent, or Firm*—Greenblum & Bernstein P.L.C.

[57] ABSTRACT

An exposure condition when an electronic flash is to be used, i.e., an aperture value and a shutter speed, is determined based on a photometry value. Under the exposure condition, a photographing operation is carried out without use of the electronic flash, and image data obtained by this photographing operation are stored in a first image memory. Further, another photographing operation is carried out with use of the electronic flash, and image data obtained by this photographing operation are stored in a second image memory. The image data stored in the first and second image memories are read out and the luminance signals of corresponding pixels are compared. When the difference between the luminance signals is large, the white balance adjustment is performed based on electronic flash light. When the difference between the luminance signals is small, the white balance adjustment is performed based on the ambient daylight.

10 Claims, 4 Drawing Sheets

| L | L > S1 | S2 ≦ L ≦ S1 | L < S2 |
|---|---|---|---|
| WB | FLASH OF LIGHT | INTERMEDIATE BETWEEN F/L AND A/D | AMBIENT DAYLIGHT |

ADJUSTING A WHITE BALANCE IN A CAMERA USING A FLASH

BACKGROUND OF THE INVENTION

1. Field of the Invention

The present invention relates to a white balance adjusting device provided in a still-video camera having an electronic flash.

2. Description of the Related Art

Conventionally, in a recording operation of a still-video camera a white balance adjustment is performed so that an image of a white object recorded on a recording medium is reproduced as a white image regardless of the color temperature of the light radiated onto the object in the photographing operation. For example, when the color temperature of the radiated light is high, a coefficient by which a differential color signal Cb, including a blue (B) signal, is multiplied is set to a smaller value than a coefficient by which a differential color signal Cr, including a red (R) signal is multiplied, so that a sensitivity to a blue light is reduced so as to prevent the white object from being reproduced as a blue-tinged object.

In such a white balance adjustment, however when the color temperature of the ambient daylight is different from that of the light radiated by the electronic flash in a photographing operation in which the electronic flash is used the photographed image may be reproduced in an unnatural color. Namely since the flash of light reaches only a predetermined portion of an object located at a distance, a photographed image portion corresponding to a short distance has the color temperature of the flash of light, and a photographed image portion corresponding to a long distance has the color temperature of the ambient daylight. Therefore, if the white balance adjustment is performed based on the color temperature of the flash of light, the photographed image portion corresponding to the short distance is reproduced in the proper colors, however the photographed image portion corresponding to the long distance may not be reproduced in the proper color. Similarly, if the white balance adjustment is performed based on the color temperature of the ambient daylight, the photographed image portion corresponding to the long distance is reproduced in the proper color, however the photographed image portion corresponding to the short distance may not be reproduced in the proper color.

SUMMARY OF THE INVENTION

Therefore, an object of the present invention is to provide a white balance adjusting device by which the white balance adjustment is performed accurately regardless of the object distance and in a short time.

According to the present invention there is provided a white balance adjusting device provided in a still-video camera having an electronic flash, the white balance adjusting device including exposure condition circuitry, a first memory, a second memory and white balance adjusting circuitry.

The exposure condition circuitry determines an exposure condition of the still-video camera when an electronic flash is used. The first memory stores first image data including luminance of pixels obtained by a photographing operation without radiating the electronic flash under the exposure condition. The second memory stores second image data including luminance of pixels obtained by a photographing operation with radiating the electronic flash under the exposure condition. The white balance adjusting circuitry performs a white balance adjustment to the second image data read from the second memory, in accordance with a difference between lumiances of corresponding pixels obtained from the first and second image data stored in the first and second memories.

Further, according to the present invention, there is provided a white balance adjusting device provided in a still-video camera having an electronic flash, the white balance adjusting device including an exposure condition circuitry, control circuitry and white balance adjusting circuitry.

The exposure condition circuitry determines an exposure condition of the still-video camera in a state in which the electronic flash is used. The control circuitry obtains image data to be stored in a memory. The control circuitry obtains first image data with radiating the electronic flash under the exposure condition, and second image data without radiating the electronic flash under the exposure condition. The white balance adjusting circuitry performs a white balance adjustment to the second image data in accordance with a difference between luminances of corresponding pixels obtained from the first and second image data.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
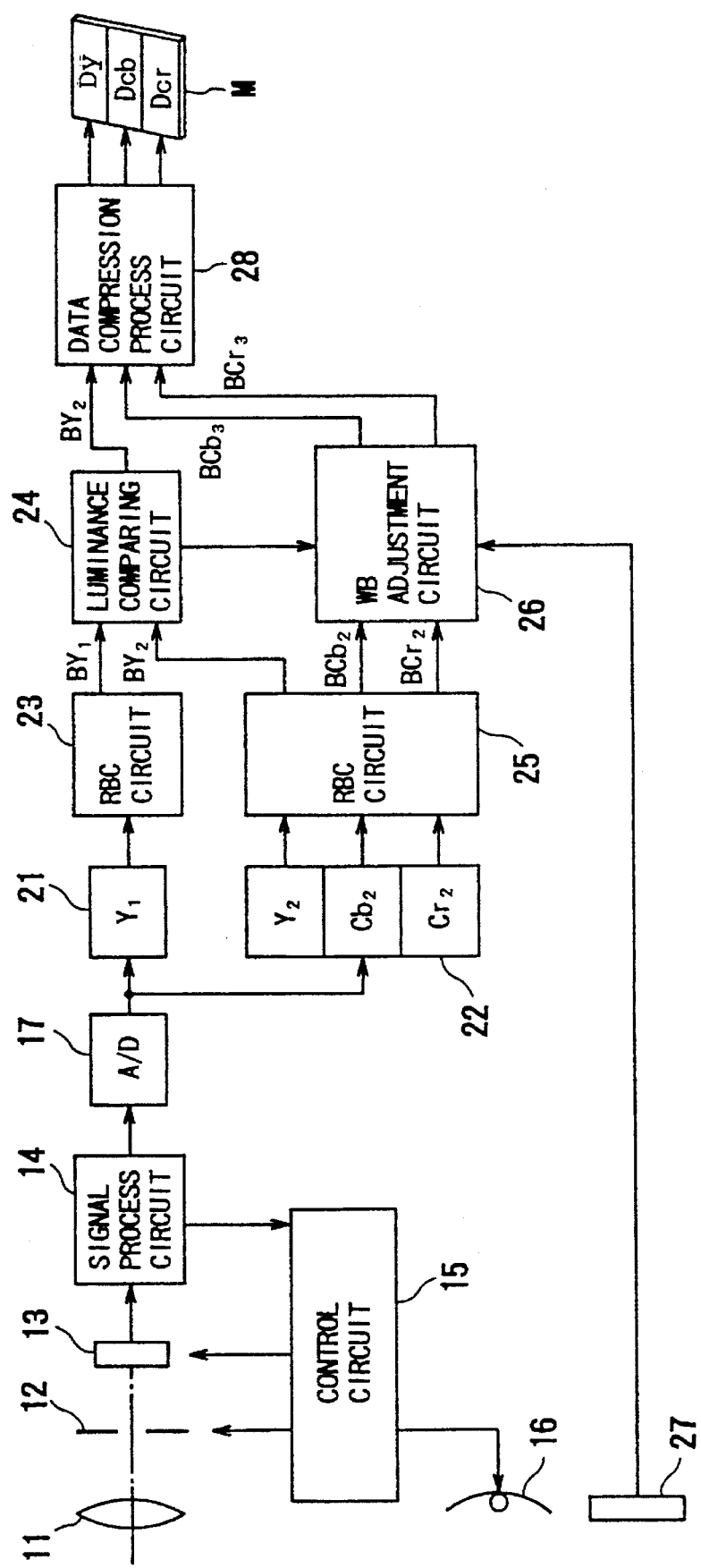
FIG. 1 is a block diagram showing a still-video camera.

The present invention will now be described with reference to embodiments shown in the drawings.

FIG. 1 is a block diagram showing the still-video camera 1.

Light reflected from an object passing through a lens 11 and an aperture 12 is radiated onto a light receiving surface of a CCD (charge coupled device) 13, and thus the object image is formed on the CCD 13. The CCD 13 has a plurality of photodiodes on a light receiving surface, and the photodiodes are disposed in a matrix arrangement. A color filter having red (R), green (G) and blue (B) filter elements is provided on the light receiving surface, and each photodiode is covered with one each of the R, G or B filter elements. The object image is converted by the photodiodes to an electronic signal corresponding to a predetermined color, and is subjected to a predetermined process by a signal process circuit 14, so that image data, having a luminance signal Y and differential color signals Cb and Cr, is generated.

In the signal process circuit 14, prior to a photographing operation, a photometry value is obtained based on photodiode or pixel data outputted from the CCD 13, and is inputted into an exposure and electronic flash control circuit 15. In the exposure and electronic flash control circuit 15, an opening degree (i.e. aperture value) of the aperture 12 and a shutter speed are determined. Thus, an exposure condition is determined based on the photometry value and an electronic charge control (an electric charge accumulation time, i.e., an exposure control) for the CCD 13 and a radiation control for the electronic flash 16 are performed. In this embodiment under the exposure condition, a first exposing operation in which the electronic flash 16 is not radiated and a second exposing operation in which the electronic flash 16 is radiated are carried out.

The image data outputted from the signal process circuit 14 is converted to digital data by an A–D converter 17 and is inputted into a first image memory 21 or a second image memory 22. Image data obtained by the first exposing operation, i.e., a first luminance signal $Y_1$, is stored in the first image memory 21. Image data obtained by the second exposing operation, i.e. a second luminance signal $Y_2$ and differential color signals $Cb_2$ and $Cr_2$, is stored in the second image memory 22, which has a plurality of memory areas independent from each other for storing the second luminance signal $Y_2$ and the differential color signals $Cb_2$ and $Cr_2$, and each memory area has one image frame's worth of storage.

The first luminance signal $Y_1$ read out from the first image memory 21 is raster-block-converted to a signal $BY_1$ by a raster-block conversion circuit 23, so that one image's worth of pixel data is divided into N blocks, each of which is composed of an 8×8 matrix of pixels. When the number of pixels of one image is approximately 400,000, N is approximately 6200. The first luminance signal $BY_1$ divided into blocks is inputted into a luminance comparing circuit 24.

The second luminance signal $Y_2$ and the differential color signals $Cb_2$ and $Cr_2$ read out from the second image memory 22 are raster-block-converted by the raster-block conversion circuit 25. The second uminance signal $BY_2$ derived from the second luminance signal $Y_2$ is divided into blocks, and is inputted into the luminance comparing circuit 24, and the differential color signals $BCb_2$ and $BCr_2$ are inputted into a white balance adjustment circuit 26. Note that, although only one raster-block conversion circuit 25 is shown in FIG. 1, a raster-block conversion circuit 23 is provided for each signal $Y_2$, $Cb_2$ and $Cr_2$.

Figure 2:
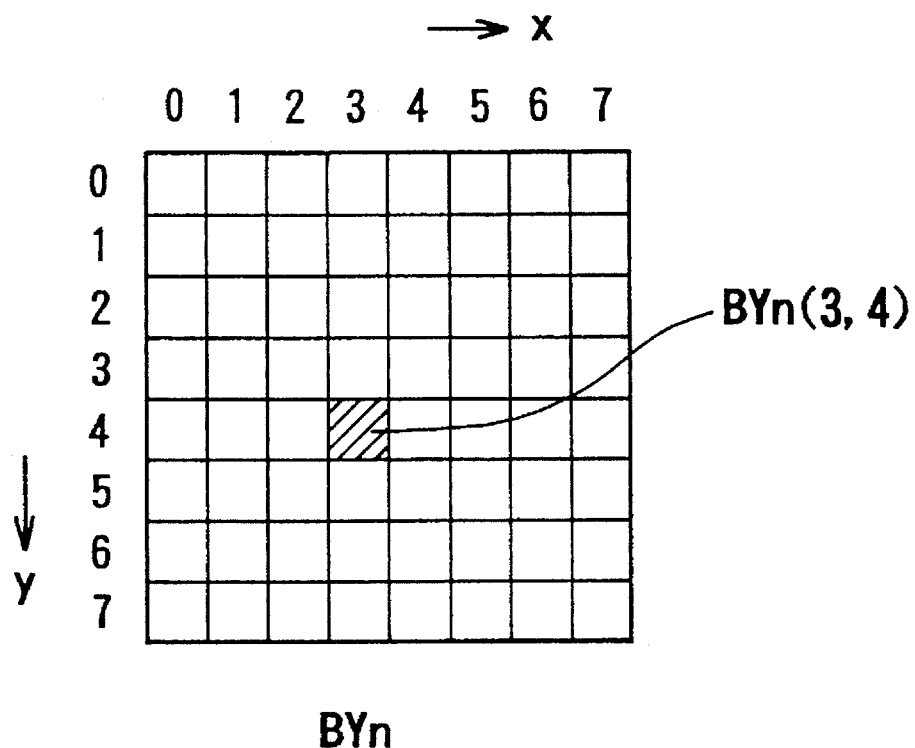
FIG. 2 is a diagram showing an 8×8 matrix of pixels.

FIG. 2 shows an 8×8 block of pixels. A parameter x indicates a position of a pixel in a horizontal direction, and a parameter y indicates a position pixel in a vertical direction. The parameters x and y have values from 0 through 7. For example, a luminance signal of the pixel fourth from the left end and fifth From the upper end is indicated by $BY_n(3,4)$. Note that the coordinates (x,y) are relative ones defined for each block.

In the luminance comparing circuit 24, the first and second luminance signals $BY_1$ and $BY_2$ are compared with each other, and a luminance comparing function L(x,y) is obtained according to a following equation (1).

$$L(x,y)=BY_1(x,y)-BY_2(x,y) \qquad (1)$$

Namely, the luminance comparing function L(x,y) gives the difference between the luminance signals $BY_1$ and $BY_2$ of corresponding pixels, and is obtained for a representative pixel (for example, (3,4)) in each block. Note that it is supposed that this representative pixel shows an average luminance value of the block and is not necessarily positioned at the center of the block.

Regarding a pixel or a photodiode provided in the CCD 13, in a pixel receiving a radiated flash of light reflected from the object, the second luminance signal $BY_2$ has a substantially larger value than that of the first luminance signal $BY_1$, and in a pixel receiving light from the object when a flash of light is not radiated, the second luminance signal $BY_2$ has substantially the same value as that of the first luminance signal $BY_1$. Therefore, in this embodiment, when the value of the luminance comparing function L(x,y) is larger than a predetermined standard level, the white balance adjustment is performed based on the flash of light. When the value of the luminance comparing function L(x,y) is smaller than the standard level, the white balance adjustment is performed based on the ambient daylight.

The standard level has a value within a predetermined range. Namely, when the value of the luminance comparing function L(x,y) is within the predetermined range, the white balance adjustment is performed based on a light intensity which is intermediate i.e., between that of the flash of light and that of the ambient daylight.

In the luminance comparing circuit 24, values of the luminance comparing function L(x,y) are obtained for the representative pixel from each block, and in the white balance adjustment circuit 26, the white balance adjustment is performed for every block, based on the luminance comparing function L(x,y). Namely, the differential color signals $BCb_2$ and $BCr_2$ are multiplied by coefficients Ab and Ar obtained in accordance with the luminance comparing function L(x,y), respectively so that the differential color signals $BCb_3$ (i.e. $BCb_2 \times Ab$) and $BCr_3$ (i.e., $BCr_2 \times Ar$) subjected to the white balance adjustment are obtained.

Since the color temperature of the flash of light is constant, the white balance adjustment based on the flash of light is performed using a first coefficient which is constant and stored beforehand in the white balance adjustment circuit 26. Conversely, since the color temperature of the ambient daylight varies in accordance with photographing conditions, the white balance adjustment based on the ambient daylight is performed using a second coefficient which is generated by the white balance adjustment circuit 26, based on a signal outputted from a white balance sensor 27 which is provided on an outer surface of the camera body to sense the color temperature of the ambient daylight.

The differential color signals $BCb_3$ and $BCr_3$ outputted from the white balance adjustment circuit 26 and the second luminance signal $BY_2$ outputted from the luminance comparing circuit 24 are input to a data compression process circuit 28 and subjected to processes such as, for example, discrete cosine transformation, quantization and Huffman encoding, according to the JPEG (Joint Photographic Experts Group) algorithm. Thus the signals $BCb_3$, $BCr_3$ and $BY_2$ are compressed. The compressed image signals (Dy, Dcb, Dcr) are recorded to an IC memory card (a recording medium) M.

Figure 3:
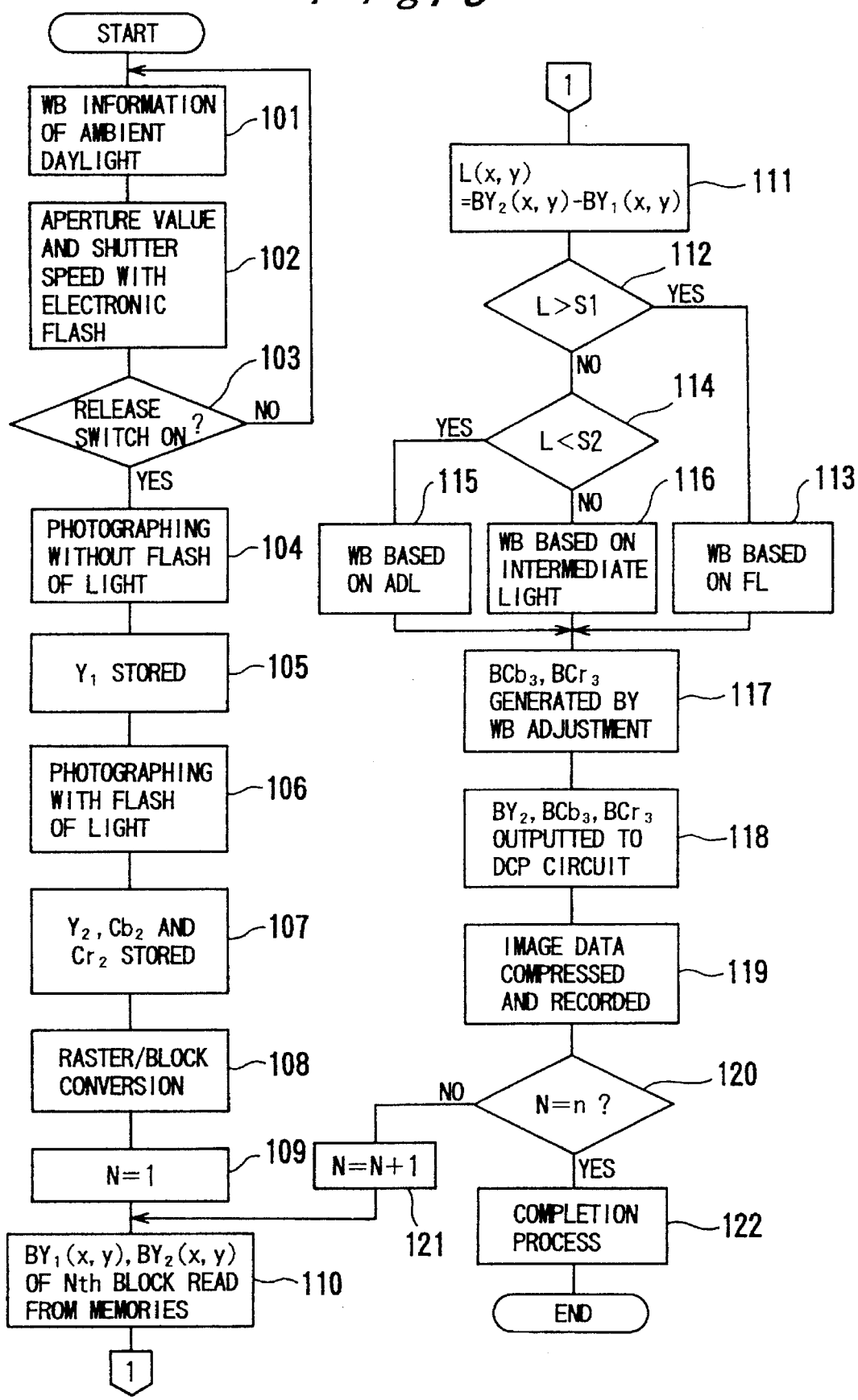
FIG. 3 is a flow chart of a routine of a white balance adjustment.

FIG. 3 shows a flow chart of a routine of the white balance adjustment of the embodiment.

In Step 101, white balance information related to the ambient daylight is obtained based on a signal outputted by the white balance sensor 27. In Step 102, a proper aperture value and a shutter speed when using the electronic flash 16, i.e. an exposing condition, is determined by the exposure and electronic flash control circuit 15, based on a photometry value inputted from the signal process circuit 14. When it is determined in Step 103 that a release switch (not shown) is not turned ON by the photographer, the process returns to Step 101. Conversely, when it is determined in Step 103 that the release switch is turned ON, the process goes to Step 104 so that the following photographing operation is carried out, and thus compressed image data is recorded in the recording medium M.

In Step 104, a photographing operation is carried out under the exposing condition without radiating the electronic flash 16 (the first exposing operation). An electronic signal generated in the CCD 13 in this photographing operation is transformed into the first luminance signal $Y_1$ in the signal processing circuit 14. The first luminance signal $Y_1$ is stored in the first image memory 21 in Step 105. In Step 106, a photographing operation is carried out with radiating the electronic flash 16 (the second exposing operation), and the second luminance signal $Y_2$ and the differential color signals $Cb_2$ and $Cr_2$ are obtained, which are stored in the second image memory 22 in Step 107.

In Step 108, the first luminance signal $Y_1$ is read out from the first image memory 21, and is raster-block-converted by the raster-block conversion circuit 23. Similarly, the second luminance signal $Y_2$ and the differential color signals $Cb_2$ and $Cr_2$ are read out the second image memory 22, and are raster-block-converted by the raster-block conversion circuit 25. In Step 109, the block number N is set to 1. In Step 110, the luminance signals $BY_1(x,y)$ and $BY_2(x,y)$ of the representative pixels (x,y) from the block of block number N are read from the first and second image memories 21 and 22. In Step 111, a difference between the first and second luminance signals $BY_1(x,y)$ and $BY_2(x,y)$, i.e., the luminance comparing function L(x,y), is calculated by the luminance comparing circuit 24 according to the equation (1).

Figures 4, 5:
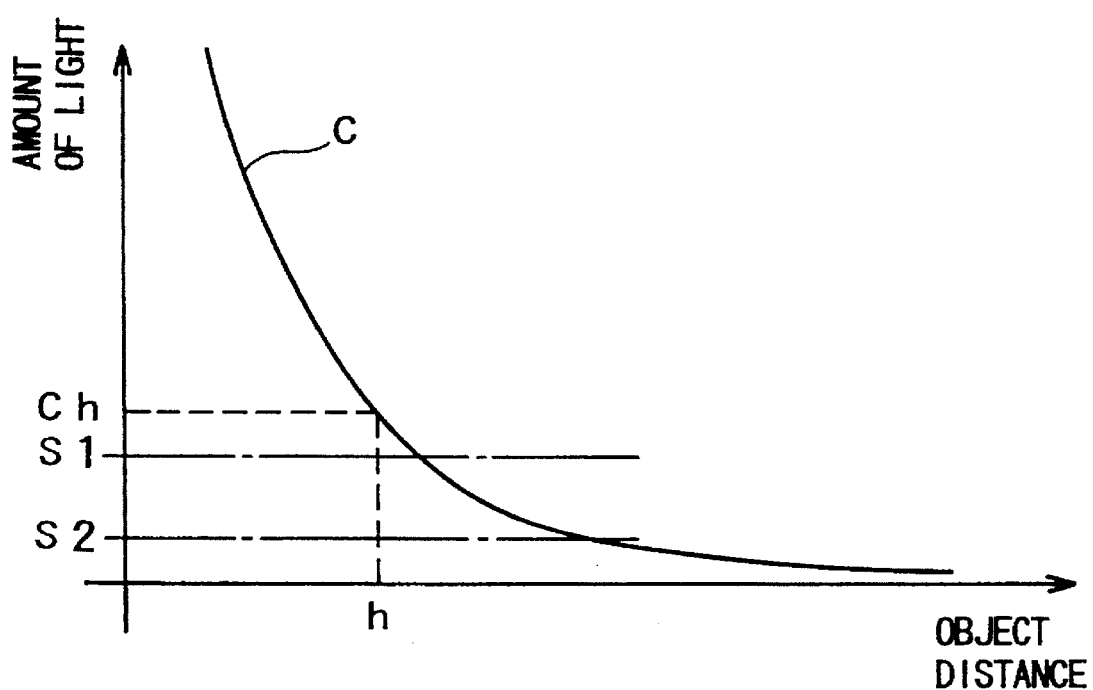
FIG. 4 is a table showing a relationship between a value of a luminance comparing function L(x,y) and a light intensity used as a reference in the white balance adjustment.
FIG. 5 is a graph showing a relationship between an object distance and the amount of light.

In Steps 112 through 117, coefficients Ab and Ar of the white balance adjustment are set in accordance with the value of the luminance comparing function L(x,y). FIG. 4 shows a relationship between the value of the luminance comparing function L(x,y) and a light intensity used as a reference in the white balance adjustment. As understood from this drawing, the coefficients Ab and Ar of the white balance adjustment are set based on the flash of light when the luminance comparing function L(x,y) is larger than a first standard value S1. The coefficients Ab and Ar of the white balance adjustment are set based on the ambient daylight when the luminance comparing function L(x,y) is smaller than a second standard value S2. The coefficients Ab and Ar of the white balance adjustment are set based on an intermediate light intensity between the flash of light and the ambient daylight when the luminance comparing function L(x,y) is between the first and second standard values S1 and S2.

As shown by a solid line C in FIG. 5, the amount of light radiated by the flash, reflected from the object and received at the camera lens becomes large as the object distance is short, and the first standard value S1 has a larger value than the second standard value S2, by a predetermined amount. Namely, in an object located at a distance h from the camera, since the amount of light radiated on the object (Ch) is larger than the first standard value S1, the white balance adjustment for pixels corresponding to the object is performed based on the flash of light. Conversely, in pixels corresponding to a background (infinity), the amount of light radiated onto the object is equal to zero, and is smaller than the second standard value S2. Therefore, the white balance adjustment is performed based on the ambient daylight.

In Step 112 of FIG. 3, it is determined whether or not the luminance comparing function L(x,y) is larger than the first standard value S1. When the luminance comparing function L(x,y) is larger than the first standard value S1, Step 113 is executed in which the coefficients Ab and Ar of the white balance adjustment reset based on the flash of light (FL in FIG. 3). When it is determined in Step 112 that the luminance comparing function L(x,y) is smaller than the first standard value S1, it is determined in Step 114 whether or not the luminance comparing function L(x,y) is smaller than the second standard value S2. When the luminance comparing function L(x,y) is smaller than the second standard value S2, Step 115 is executed in which the coefficients Ab and Ar of the white balance adjustment are set based on the ambient daylight (ADL in FIG. 3). When the value of the luminance comparing function L(x,y) is between the first and the second standard values S1 and S2, Step 116 is executed in which the coefficients Ab and Ar of the white balance adjustment are set based on a light intensity intermediate between that of the flash of light and that of the ambient daylight.

In Step 117, the white balance adjustment is performed for the block of block number N by using the coefficients Ab and Ar of the white balance adjustment obtained in Step 113, 115 or 116, so that the differential color signals $BCb_3$ and $BCr_3$ are generated. In Step 118, the second luminance signal $BY_2$ and the differential color signals $BCb_3$ and $BCr_3$ are outputted to the data compression process circuit 28. In Step 119, the signals $BY_2$, $BCb_3$ and $BCr_3$ are compressed by the data compression circuit 28, and recorded in the recording medium M.

In Step 120, it is determined whether or not the block number N has reached the number of blocks "n" of one image (for example, 6200). When it is determined that the block number N has not reached the number "n", the number N is increased by one in Step 121, and then the process returns to Step 110 so that the above described operations are performed again. Conversely, When it is determined in Step 120 that the block number N has reached the number "n", a record operation completion process (such as a process for prohibiting writing on the recording medium N) is executed in Step 122, and this routine ends.

As described above, in this embodiment, image data obtained when a flash of light is radiated and image data obtained when a flash of light is not radiated are compared with each other for each block. Then, the white balance adjustment is performed based on the flash of light for a block on which the flash of light has an effect higher than a standard level, and the white balance adjustment is performed based on ambient daylight for a block on which the flash of light has an effect lower than the standard level. Therefore, even if photographing operation is carried out to an image in which a long distance object and a short distance object exist, the white balance adjustment is performed to every block, and with a simple process in a short time.

Further, in the embodiment, the data unit (the block) for which the white balance adjustment is performed is coincident with the data unit for which the image compression process is performed. Therefore, the data process including the white balance adjustment and the image compression process has high efficiency.

Note that, although a separate white balance adjustment was performed for each individual block in the above embodiment, the same white balance adjustment may be performed for any two or more selected blocks.

Further note that, although the white balance adjustment was performed in three steps by providing two standard value S1 and S2 in the above embodiment, the number of standard values may be one or more than two.

Although the embodiments of the present invention have been described herein with reference to the accompanying drawings obviously many modifications and changes may be made by those skilled in this art without departing from the scope of the invention.

The present disclosure relates to subject matter contained in Japanese Patent Application No. HEI 6-140866 (filed on May 31, 1994) which is expressly incorporated herein, by references in its entirety.

I claim:

1. A white balance adjusting device provided in a still-video camera having an electronic flash, said white balance adjusting device comprising:

means for determining an exposure condition of said still-video camera when said electronic flash is to be used;

a first memory for storing first image data obtained by a first photographing operation for said exposure condition, said first photographing operation being performed without using said electronic flash, said first image data including pixel luminance data;

a second memory for storing second image data obtained by a second photographing operation for said exposure condition, said second photographing operation being performed by using said electronic flash, said second image data including pixel luminance data; and means for performing a white balance adjustment for said second image data read from said second memory, in accordance with a difference between luminance data of corresponding pixels, obtained from said first and second image data stored in said first and second memories.

2. A white balance adjusting device according to claim 1, wherein said performing means performs said white balance adjustment for a pixel on which said electronic flash has an effect higher than a predetermined level based on light emitted by said electronic flash, said performing means performing said white balance adjustment for another pixel on which said light emitted by said electronic flash has an effect lower than said predetermined level based on ambient daylight.

3. A white balance adjusting device according to claim 1, wherein said performing means performs said white balance adjustment, when said difference is larger than a predetermined standard level, based on light emitted by said electronic flash, and said performing means performs said white balance adjustment, when said difference is smaller than said predetermined standard level, based on ambient daylight.

4. A white balance adjusting device according to claim 1, wherein a predetermined standard level comprises a predetermined range, said performing means performing said white balance adjustment when said difference is within said predetermined range, based on an intermediate light intensity between an intensity of light emitted by said electronic flash and ambient daylight.

5. A white balance adjusting device according to claim 1, further comprising a white balance sensor by which a color temperature is sensed.

6. A white balance adjusting device according to claim 5, wherein said white balance adjustment, based on light emitted by said electronic flash, is performed using a first coefficient, said first coefficient comprising a constant value, and said white balance adjustment based on ambient daylight is performed using a second coefficient, said second coefficient being obtained by a signal outputted from said white balance sensor.

7. A white balance adjusting device according to claim 1, said performing means comprises:

means for dividing said first image data and said second image data into a plurality of blocks of data;

means for comparing luminance signals of each block of said plurality of blocks of data of said first image data to a corresponding block of said plurality of blocks of data of said second image data to obtain a difference between said luminance signals; and means for determining coefficients of said white balance adjustment based on said difference between said luminance signals obtained by said comparing means.

8. A white balance adjusting device according to claim 7, further comprising a compression unit for image compression of said white balance adjusted image data, wherein said white balance adjustment is performed for said each block of said second image data coincident with said image compression.

9. A white balance adjusting device provided in a still-video camera having an electronic flash, said white balance adjusting device comprising:

means for determining an exposure condition of said still-video camera in a state in which said electronic flash is to be used;

means for obtaining image data to be stored in a memory, said image data comprising first image data, for said exposure condition by using said electronic flash, and second image data, for said exposure condition without using said electronic flash; and means for performing a white balance adjustment to said second image data, in accordance with a difference between obtained luminances of corresponding pixels, said luminances being obtained from said first and second image data.

10. A white balance adjusting device for a camera having an electronic flash, comprising:

first means for storing pixel luminance data obtained by a photographing operation performed without a use of the electronic flash;

second means for storing pixel luminance data obtained by a photographing operation performed with the use of the electronic flash; and means for adjusting a white balance in accordance with a difference between pixel luminance data of corresponding pixels stored in said first and second storing means.

* * * * *